Oct. 10, 1967   W. O. CRALLE, JR., ET AL   3,346,091
TABULATION APPARATUS FOR TYPEWRITER
Filed June 30, 1965

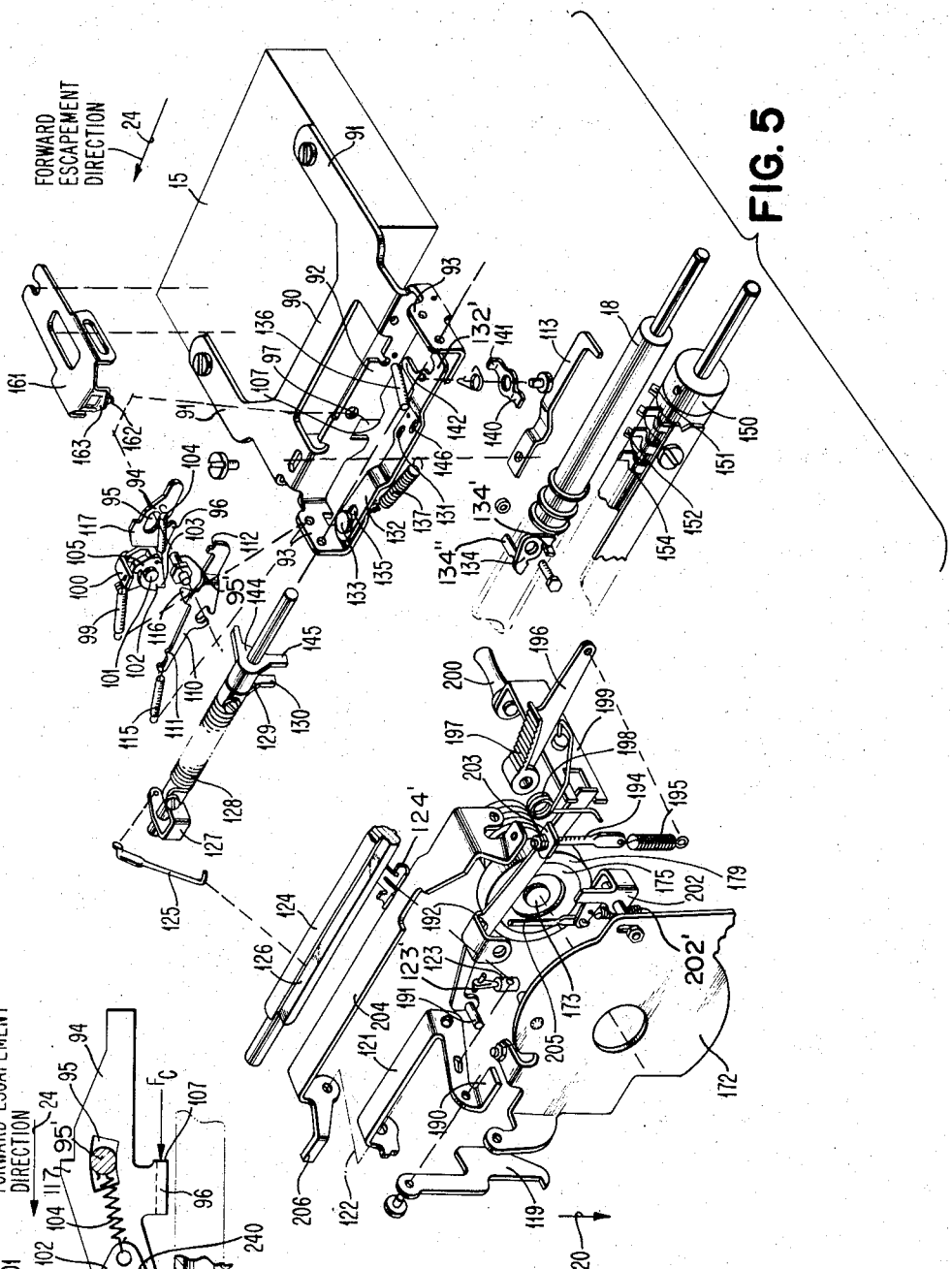
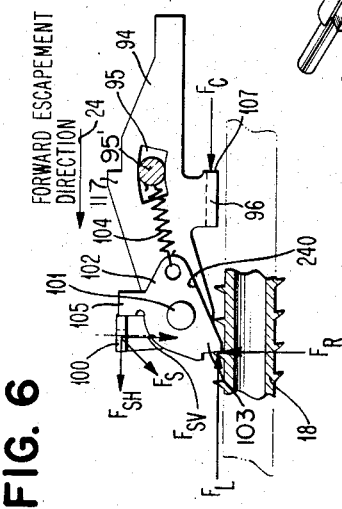

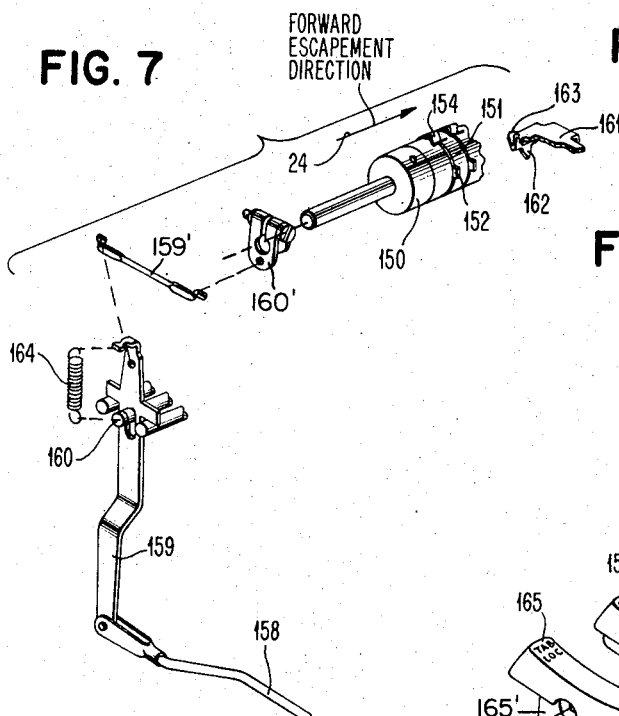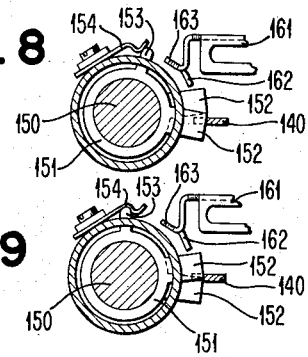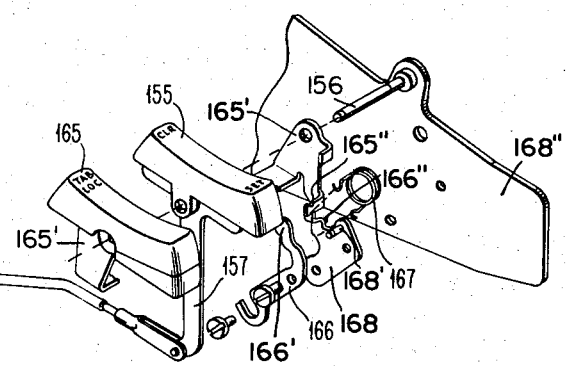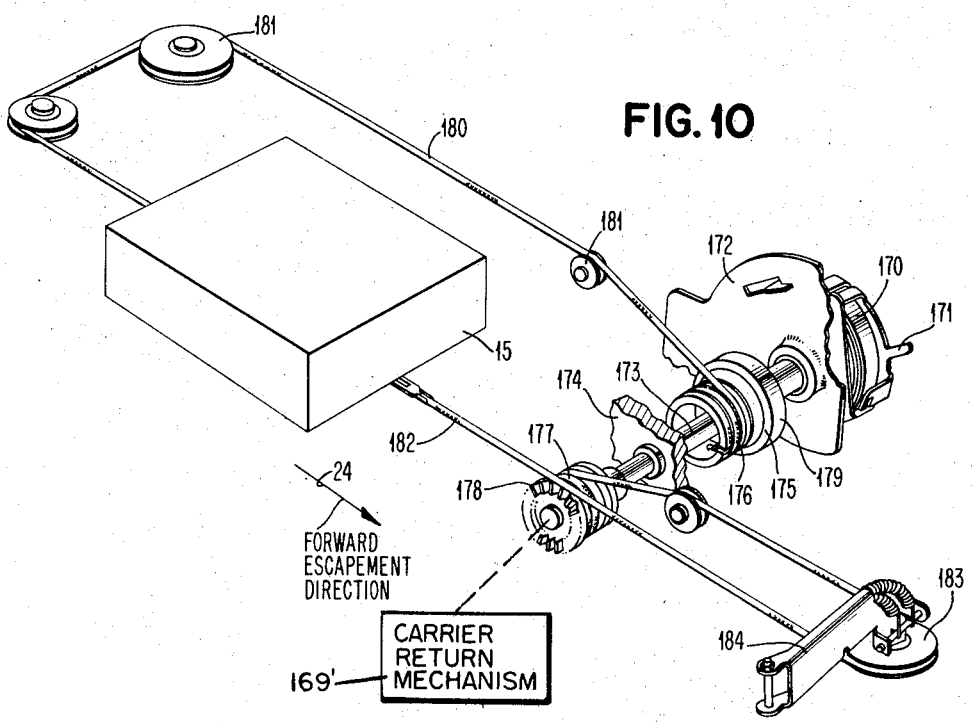

Oct. 10, 1967  W. O. CRALLE, JR., ET AL  3,346,091
TABULATION APPARATUS FOR TYPEWRITER
Filed June 30, 1965
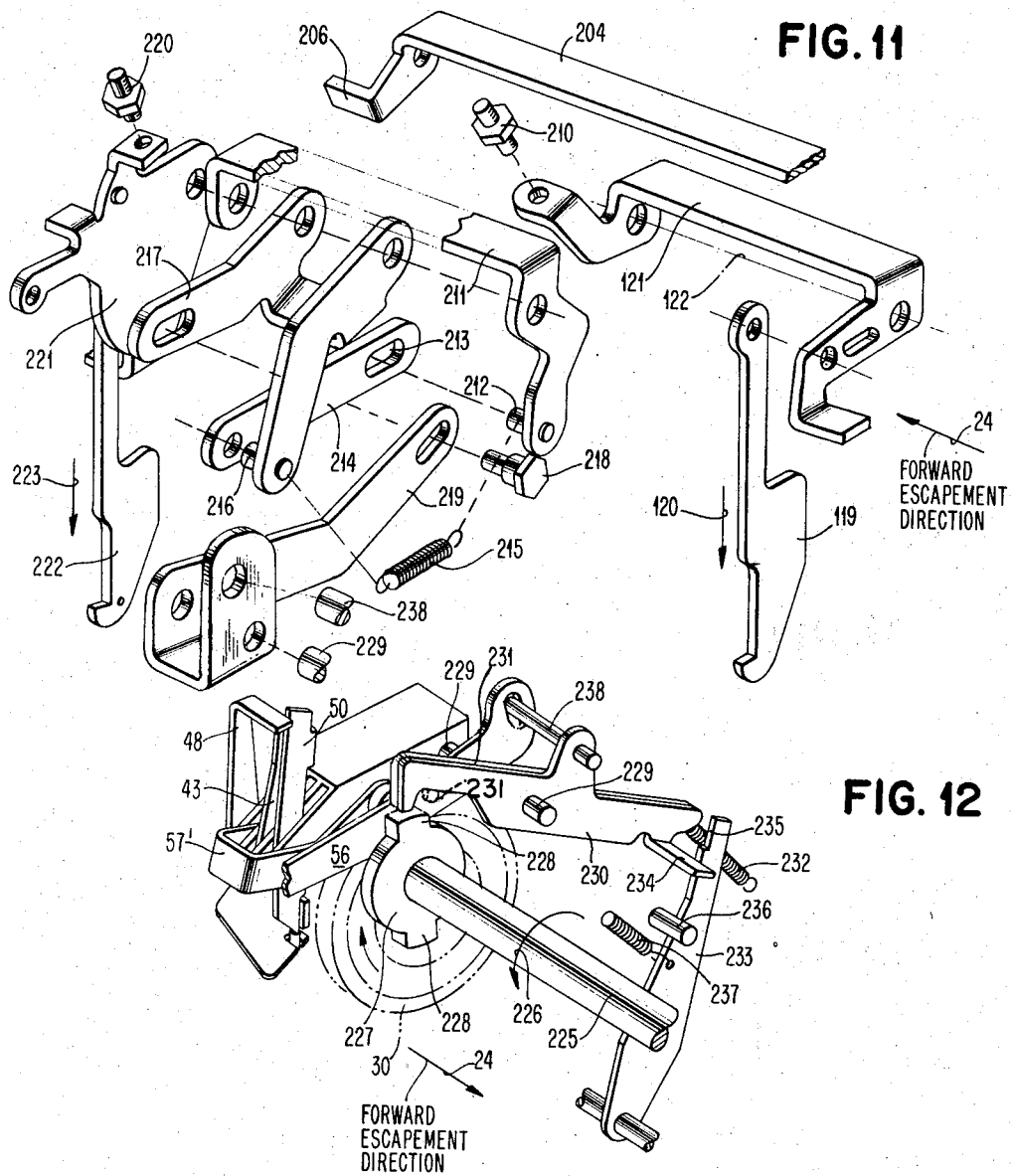
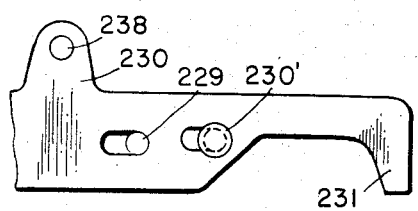
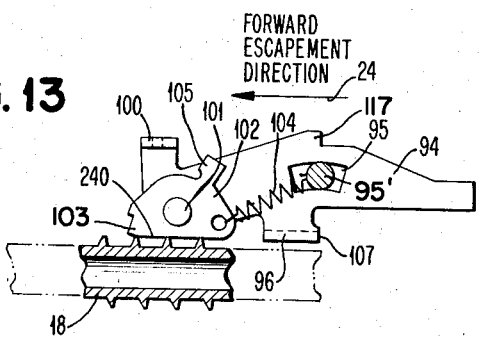

United States Patent Office 3,346,091
Patented Oct. 10, 1967

3,346,091
TABULATION APPARATUS FOR TYPEWRITER
Walter O. Cralle, Jr., Georgetown, and Kenneth A. Lennon and Neil D. Walton, Lexington, Ky., assignors to International Business Machines Corporation, Armonk, N.Y., a corporation of New York
Filed June 30, 1965, Ser. No. 468,353
12 Claims. (Cl. 197—176)

The present invention relates generally to the typewriter and printing arts and more particularly to the provision of improved tabulation apparatus for use with a typewriter or similar business machine. As will be hereinafter more fully explained, mechanism is provided for locating the carrier of the typewriter at each and every tab position irrespective of the set and clear states of the individual tab stops. This permits the typist to very quickly and accurately locate and align a selected tab stop with the carrier of the typewriter for setting or clearing operations.

The tabulation apparatus of this invention is described and illustrated in combination with a single element typewriter embodying proportional escapement apparatus. The print element is easily removed and replaced whereby the type font or style is readily changed. This permits the typewriter to be employed for an almost unlimited variety of typing operations. A basic single element typewriter of this general type is manufactured by International Business Machines Corporation, Armonk, N.Y., and is sold under the trademark "Selectric." A complete description of this typewriter is set forth in "IBM Customer Engineering Series 72 Instruction Manual," Form 241–5032–0, copyright 1961.

It is, of course, well known in the art to provide tabulation apparatus for a typewriter or similar business machine to permit rapid advancement of a carrier in the forward escapement direction to selected tab positions. In a proportional escapement typewriter, the number of tab stops or tab positions is usually considerably less than the number of incremental escapement units and possible printing positions of the carrier. A problem which has previously been encountered in employing tabulation apparatus on a proportional escapement typewriter is that of aligning the carrier with a selected tab stop to permit setting or clearing of the selected tab stop. The incremental escapement units are so small the typist has difficulty in aligning the carrier at a selected tab position using normal forwardspace and backspace operations of the typewriter or manual movement of the carrier where such movement is permitted by the escapement apparatus.

The above problem has long been recognized and various solutions have been proposed in the art. One proposed solution employs a plurality of tab locating stops in addition to the tabulating stops and the proportional escapement apparatus. When a tab set keybutton is depressed the carrier advances to a tab locating stop which corresponds to a tab position and the associated tab stop is set. This prior art arrangement is objectionable because the additional tab locating stops and associated mechanism are relatively complex and add considerable cost to the tabulation apparatus. Further, there are many instances during typing when it is desired to locate the carrier at a tab position without setting the corresponding tab stop and this is not readily accomplished using the prior art arrangement.

Briefly, the present invention is concerned with tabulation apparatus comprising an elongated tabulation rack having a plurality of tabulation stops mounted thereon at relatively closely spaced points. The tab stops are each movable between set and clear positions or states in response to relative movement between the tab rack and a set and clear means mounted from the carrier of the typewriter upon actuation of a typist controlled means. When a tab stop is in the set state, it is adapted to be engaged by a tab sensor mounted on the carrier to terminate a tabulation operation. Mechanism is incorporated which causes relative movement between the tab rack and the carrier to position all tab stops in the path of travel of the tab sensor mounted from the carrier irrespective of the set and clear states of the tab stops. This mechanism is controlled by a separate typist controlled means located on the typewriter.

It is the primary or ultimate object of this invention to provide tabulation apparatus for typewriters or similar machines where the tab stops are movable to an intermediate tab locate position relative to a tab sensor carried by the typewriter carrier. This permits the carrier to be advanced and accurately positioned at each tab position prior to setting or clearing the selected tab stop.

Another object of the invention is to provide tabulation apparatus incorporating tab locate means which is easily and quickly operated by the typist. Actuation of a tab locate keybutton moves the tab rack into the intermediate tab locate position while actuation of a different and separate tab set and clear keybutton operates the mechanism to set or clear the selected tab stop.

A further object of the invention is to provide tabulation apparatus having the characteristics described above which is extremely simple in construction and can be manufactured at relatively low cost. Only a minimum of mechanism in addition to the basic tabulation assembly is required to provide for the tab locate operation and the need for separate tab locating stops is completely eliminated.

The foregoing and other objects and advantages of the invention will be apparent from the following more particular description of a preferred embodiment of the invention as illustrated in the accompanying drawings.

Figure 2:
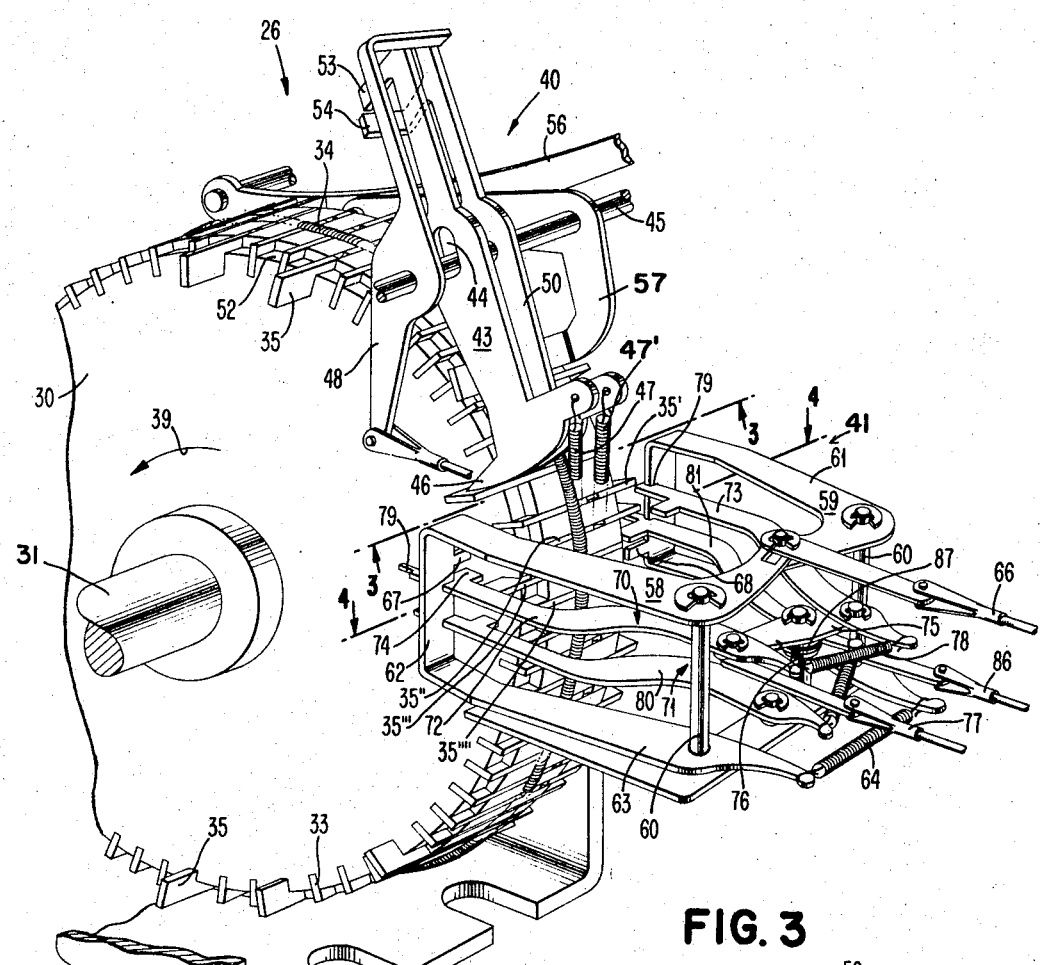
FIGURE 2 is a side perspective view illustrating in greater detail a portion of the escapement control apparatus employed in the single element typewriter of FIGURE 1.
Figure 3:
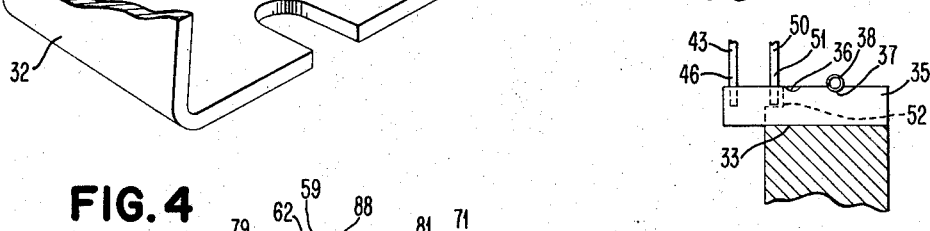
Figure 4:
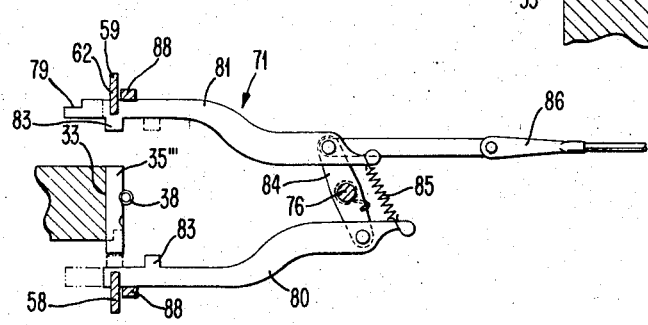
Figure 5A:
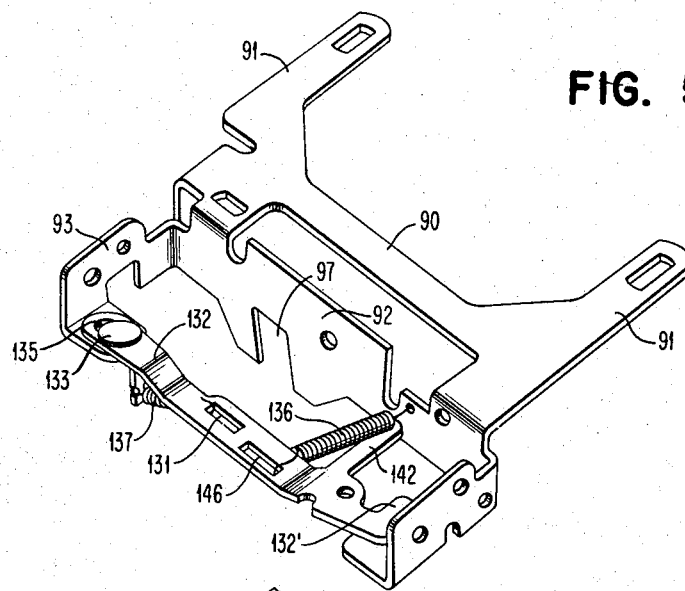
Figure 5B:
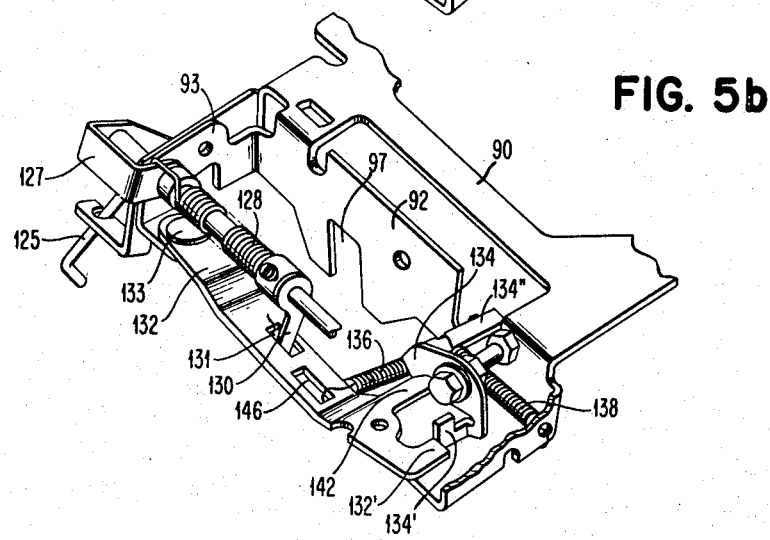
Figure 5C:
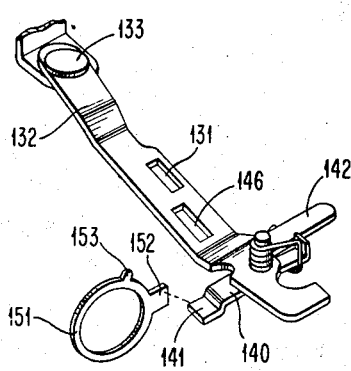

FIGURES 3 and 4 are plan sectional views taken along the section lines 3—3 and 4—4, respectively, of FIGURE 2;

FIGURE 5 is an exploded side perspective view as seen from the rear of the typewriter showing the carrier mechanism used in the typewriter;

FIGURES 5A, 5B and 5C are perspective views showing portions of the apparatus of FIGURE 5 in assembled relation;

FIGURE 6 is an elevational view as seen from the rear of the typewriter depicting the manner in which the follower normally engages the lead screw;

FIGURE 7 is an exploded side perspective view illustrating the keybutton controlled apparatus for performing a tab locate operation and setting and clearing selected tab stops;

FIGURES 8 and 9 are similar end views showing the positions of set and cleared tab stops relative to the tab sensor for normal and tab locate orientations of the tab rack, respectively.

FIGURE 10 is a schematic side perspective view illustrating the mechanism employed for moving the carrier during tabulation and carrier return operations when the follower is removed from the lead screw;

FIGURE 11 is an exploded side perspective view showing the actuating arrangements employed for removing the escapement and holding pawls from the pin wheel during carrier return and tabulation operations;

FIGURE 12 is a side perspective view illustrating the holding mechanism;

FIGURE 13 is an elevational view similar to FIGURE 6 showing the manner in which the lead screw follower spans and rides over adjacent turns of the thread on the lead screw during carrier return operations; and FIGURE 14 is a fragmentary view showing the mounting and relative positions of the home unlatching and home sensing pawls.

Figure 1:
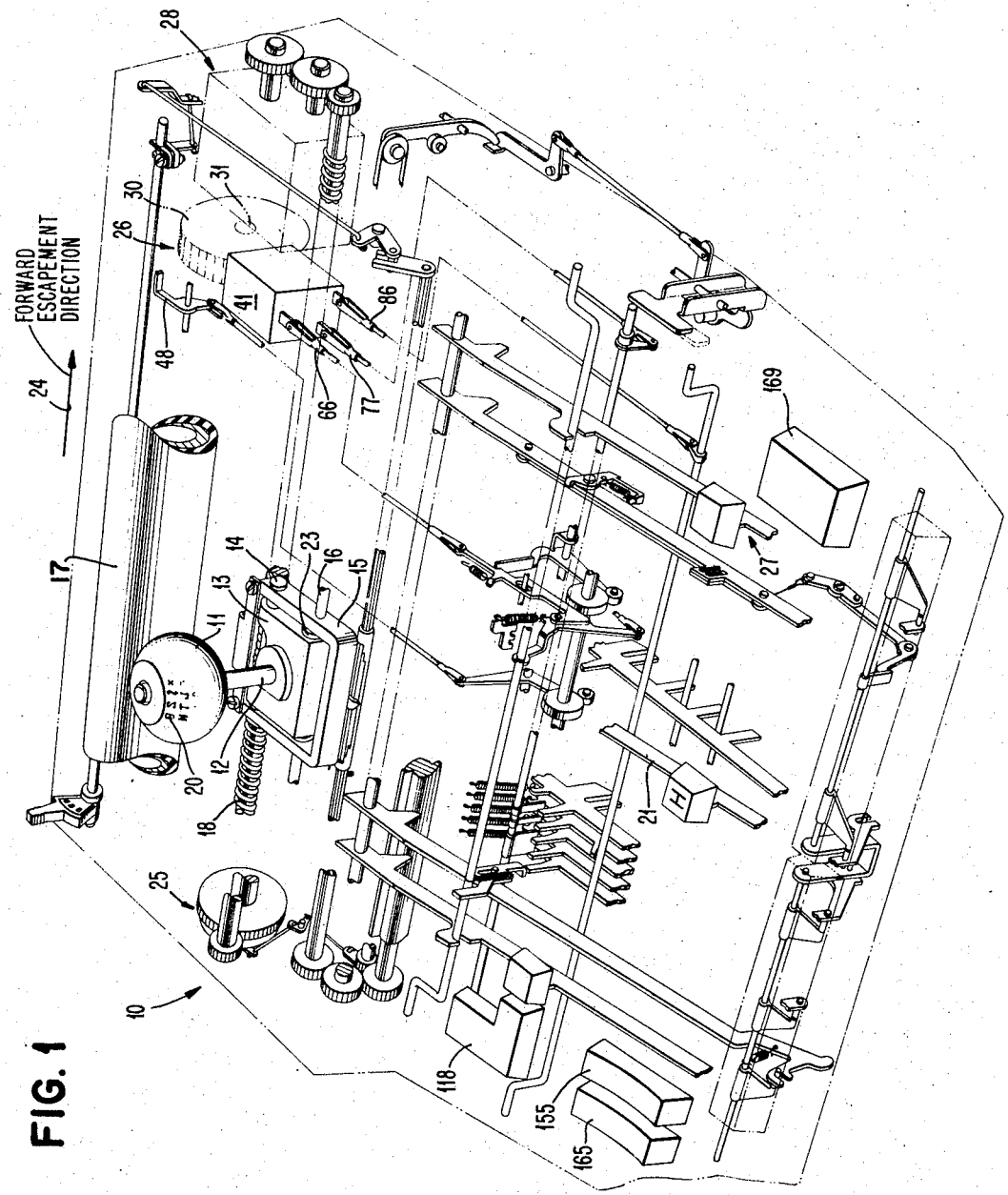
FIGURE 1 is a front perspective vew of a single element typewriter embodying apparatus constructed and operating in accordance with the teachings of the invention.

Referring now to the drawings, and initially to FIGURE 1 thereof, the reference numeral 10 designates generally a single element typewriter employing carrier mechanism constructed in accordance with the teachings of the present invention. The typewriter comprises an interchangeable print element 11 which is detachably secured to a mounting post 12. The print element 11 is mounted from a rocker plate 13 which is in turn pivoted by pins 14 to a carrier 15. The carrier is mounted for longitudinal sliding movement on guide shaft 16 in front of a relatively stationary printing platen 17. The carrier 15 has a connection with an elongated lead screw 18 extending in generally parallel relation with respect to the printing platen. As will be hereinafter more fully described, this connection comprises a lead screw follower which engages the lead screw during normal forward escapement and backspace operations but which is removed from operative engagement with the lead screw during long tabulation and carrier return operations. The distance and direction of the angular rotations imparted to lead screw 18 determine the extent and direction of the escapement and backspace movements of the carrier 15 and print element 11.

The print element 11 has the general shape of a truncated spheroid and a plurality of different size characters 20 formed thereon are arranged in generally aligned horizontal and vertical rows. The typewriter is provided with a plurality of character keylevers, such as keylever 21, and a number of function keylevers, such as case shift, carrier return and tabulation keylevers. Each of the character keylevers is associated with two of the characters formed on the print element with the state of the case shift keylever determining which of two characters is selected. The print element 11 is mounted for rotational and tilting movements on the rocker plate 13 and the movements are controlled by character selection apparatus, not shown, in response to keylever actuation to bring a selected character into printing position.

After the print element 11 has been rotated and tilted as required, the rocker plate 13 is pivoted upwardly about pivot pins 14 by the action of print cam 23 which is slidably mounted on guide shaft 16 for longitudinal sliding movement with the carrier 15. The guide shaft 16 is rotated during each printing cycle by an electric motor operating through suitable clutch and driving apparatus, not shown, to cause the print element to be rocked forward toward the printing platen 17 and effect printing of the selected character. The print element 11 falls back from the printing platen 17 and is returned to its original or home position. The lead screw 18 is then rotated and the print element advances by an escapement distance corresponding to the size or width of the previously selected and printed character.

The escapement apparatus for the typewriter comprises the lead screw 18 and means for rotating the lead screw in the proper direction and through a preselected angular distance corresponding to the escapement distance associated with a selected character. During printing or forward spacing operations, the carrier 15 and print element 11 are moved on a character-by-character basis from left to right in front of the printing platen 17 as seen when looking at FIGURE 1 of the drawings. The forward escapement direction is designated by arrows 24 in various views of the drawings to assist in interrelating these views. When backspacing is accomplished, the print element 11 moves in the opposite direction on a character-by-character basis.

A long tabulation operation is accomplished by removing the follower from the lead screw 18 and allowing the carrier 15 to be pulled under spring tension in the forward escapement direction until the next set tab stop is sensed. At this time, the follower is released to reengage the lead screw 18. During a carrier return operation, a pulling force is applied to the carrier 15 to return the same to the left margin and the follower automatically moves out of active engagement with the lead screw 18 until the left margin stop is sensed. As will be further explained, during tabulation and carrier return operations it is necessary to home or return the lead screw 18 to a predetermined angular position to insure the carrier 15 and print element 11 are properly positioned at the end of such operations.

To facilitate the description and understanding of the present invention, the construction and operation of the various portions of the typewriter will be discussed under appropriate topic headings in the following portions of the specification.

*Escapement apparatus*

The escapement apparatus in and of itself forms no part of the present invention and is the subject matter of copending applications Ser. No. 311,373, entitled "Proportional Escapement Apparatus for a Single Element Typewriter"; Ser. No. 311,375, entitled "Backspacing Apparatus for Proportional Escapement Typewriter"; Ser. No. 311,376, entitled "Constant Torque Drive Means for Typewriter," and Ser. No. 311,377, entitled "Pitch Changing Apparatus for Proportional Escapement Typewriter," all filed on Sept. 25, 1963, and all assigned to the assignee of the present invention. Reference should be made to these prior applications for a complete and detailed description of the escapement apparatus. The present description of this apparatus is limited to those portions which will assist in the understanding of the carrier mechanism of the single element typewriter.

This apparatus comprises generally a constant torque device 25 and associated driving means which rotate the lead screw 18 and permit the carrier 15 and print element 11 to advance with respect to the printing platen 17 when the follower engages the lead screw; escapement control apparatus 26 having a plurality of settable elements defining a limited memory; character escapement selection apparatus 27 for controlling the state of the settable elements in response to the characters selected; and pitch changing apparatus 28 providing a variable drive connection between the escapement control apparatus 26 and the lead screw 18 for changing the pitch of printing. The escapement control apparatus 26 is actuated by the character escapement selection apparatus 27 in response to character or function selection by the typist to control, in combination with the pitch changing apparatus 28, the angular movement imparted to the lead screw 18 by the constant torque device 25. During backspace operations, the escapement control apparatus 26 is itself driven to drive the lead screw 18 via the pitch changing apparatus 28.

Referring now to FIGURES 2–4 of the drawings, the escapement control apparatus 26 comprises a pin wheel 30 keyed to shaft 31. The shaft 31 is journalled for rotation in a generally U-shaped mounting bracket 32 which is located in the right rear portion of the typewriter. The pin wheel 30 has a plurality of axially extending and equally circumferentially spaced slots 33 and a circumferentially extending recess 34 of semicircular cross section formed about the periphery thereof. Received in each of the slots 33 is a pin 35 whose length is longer than the thickness of the pin wheel 30 so that one end portion thereof projects axially outward from the slot. Each pin 35 has a pair of semicircular recesses 36 and 37 in the upper edge thereof as is most clearly shown in FIGURE 3 of the drawings. Received in the semicircular recess 34 and extending about the pin wheel 30 is a garter spring 38. The garter spring 38 and the recesses 36 and 37 in the pins 35 define a detent means for maintaining each of the pins in one of two states. The first or set state for a pin 35 is when the spring 38 is received in recess 37 and a pin is in its second or reset state when spring 38 engages recess 36. The pin wheel 30 and its associated pins 35 provide a memory having a plurality of memory elements each capable of assuming either of two states. The distance between any two of the pins 35 defines a standard or basic single escapement unit.

The shaft 31 mounting the pin wheel 30 is operatively connected via suitable gearing and the pitch changing apparatus 28 to the lead screw 18. The constant torque device 25 exerts a force on the lead screw which tends to rotate the same in a clockwise direction and, as a consequence, the pin wheel 30 is biased for rotation in the escapement direction indicated by the arrows 39.

An escapement pawl assembly 40 is provided and comprises an escapement pawl 43 having an elongated slot 44 therein. This slot serves to mount the pawl for pivotal and limited longitudinal movement on pin 45. The escapement pawl 43 is positioned to one side of the pin wheel 30 in such a manner that the tip portion 46 of the pawl is adapted to engage only the ends of the set pins 35 which project outwardly from the pin wheel and does not engage any of the pins that are in the reset condition. The tip portion 46 of the pawl is normally biased into engagement with the set pins by a tension spring 47. An escapement pawl trip lever 48 is pivoted on the pin 45 and has an end portion which overlies the rear end of the escapement pawl 43.

Also mounted for pivoting movement on pin 45 in aligned side-by-side relation with respect to the escapement pawl 43 is a holding pawl 50 having a tip portion 51. The holding pawl is positioned so the tip portion thereof may engage each one of the pins 35 regardless of the state thereof. This is accomplished by providing a slot 52 along one side of the pin wheel and it should be noted that a portion of each pin is always within the slot. The tip portion of the holding pawl 50 is normally biased into engagement with the pins 35 by biasing spring 47'.

During a forward escapement movement, the end portion of the escapement pawl trip lever 48 first engages the rear end of the holding pawl 50 and lifts the tip portion 51 thereof from engagement with the set pin 35. The pin wheel 30 is held at this time since the tip portion of the escapement pawl 43 still engages the set pin 35. Eventually, and after the holding pawl has been removed from engagement with the pins, the end portion of escapement pawl trip lever 48 bears against the rear end of escapement pawl 43. The escapement and holding pawls then pivot in a counterclockwise direction as a unit and the tip 46 of the escapement pawl 43 is removed from engagement with the set pin 35. The spring 47 immediately moves the escapement pawl 43 forward due to the elongated slot 44 and a depending tab 53 on the escapement pawl 43 moves over an extension 54 on the holding pawl. The tab 53 and extension 54 define a latch which maintains the tip portion 51 of holding pawl 50 in elevated position with respect to the tip portion 46 of escapement pawl 43 and prevents the holding pawl 50 from dropping down and engaging a pin 35 before the escapement pawl 43 has been returned to its original position. When the esapement pawl 43 is pushed to the rear by the next adjacent set pin 35 so that the forward edge of slot 44 abuts pin 45, the tab 53 on this pawl has moved from extension 54 of the holding pawl and the tip 51 of the holding pawl 50 drops down behind the set pin engaged by the escapement pawl. The escapement pawl assembly is again in the initial condition shown in FIGURE 2 of the drawings and ready for another escapement operation.

During certain machine operations, such as carrier return and tabulation, it is desirable to remove both the escapement and holding pawls 43 and 50 from engagement with the pin wheel 30 for short periods of time. This is accomplished by moving pawl release arm 56 clockwise so that one arm of pawl release bellcrank 57 engages and lifts the escapement and holding pawls. The pawl release bellcrank 57 is pivoted on the pin 45 and its other arm is connected to pawl release lever 56 intermediate the ends of this lever. The manner in which the pawl release arm 56 is driven will be fully explained in following portions of the specification.

Positioned directly in front of the escapement pawl assembly 40 is a pin setting assembly 41 which is responsive to the actuation of the character escapement selection apparatus 27 when the typist selects a character or other machine function. The pin setting assembly 41 is operative to position the pins 35 to define the angular distance through which the pin wheel 30 is allowed to rotate during an escapement operation. This assembly comprises a pair of generally U-shaped pin setting arms 58 and 59 mounted for pivotal movement on spaced studs 60. Each of the arms has an upper portion 61, a vertically extending intermediate portion 62 and a lower portion 63. The forward ends of the lower portions 63 of the arms 58 and 59 are spanned by tension spring 64, while inwardly directed extensions on the forward ends of the upper portions 61 of the arms are pivotally connected to each other and a pull link 66. The arm 58 has an inwardly directed pin setting projection 67 formed on the intermediate portion 62 thereof and a similar pin setting projection 68 is provided on the vertically extending intermediate portion 62 of the pin setting arm 59. When a pulling force is applied to pull link 66, the pin setting projections 67 and 68 move inwardly to insure that the pins 35 adjacent these projections are either maintained in or moved to predetermined states.

Disposed in nesting relation between the arms 58 and 59 are a pair of pin setting mechanisms 70 and 71. The mechanism 70 comprises a pair of pin setting interposers 72 and 73 each having a pin setting projection 74 thereon. The interposers 72 and 73 are pivotally joined by a lever 75 which in turn is pivotally mounted on a stud 76 disposed between the studs 60. A pull link 77 is connected to the interposer 72 while the ends of the interposers 72 and 73 adjacent the stud 76 are spanned by a tension spring 78. The rear end of interposer 72 has a notch 79 formed therein. The vertically extending intermediate portions 62 of the pin setting arms 58 and 59 have slots therein for receiving and guiding the ends of the interposers 72 and 73, respectively. In essence, the interposers 72 and 73, lever 75 and pull link 77 define a shiftable scissor-like linkage. This linkage is biased by a spring 87 wrapped around the mounting stud 76 so that in the normal or unactuated position of the linkage as shown in FIGURE 2 of the drawings, the projection 74 on interposer 72 is positioned to engage one of the pins 35 carried by the pin wheel 30 when a pulling force is applied to pull link 66. The projection 74 on the other interposer 73 is positioned forwardly of the pin wheel 30 whereby it does not engage a pin when the rear ends of pin setting arms 58 and 59 swing inwardly. However, if a pulling force is applied to the pull link 77, the projection 74 on interposer 72 is retracted to a position where it does not engage a pin and the projection 74 on interposer 73 is moved to a position where it is operatively associated with the pin. The linkage is latched in this actuated position due to the notch 79 in the rear end of the interposer 72. As the interposer 72 moves forwardly when pull link 77 is actuated, the edge of the notch 79 passes the intermediate portion 62 of the pin setting arm 58 and this interposer is immediately forced outwardly under the action of spring 78 to latch the linkage in its actuated position. The condition of the scissor-like linkage is determined by whether or not a pulling force is applied to pull link 77 and controls whether a pin 35 positioned adjacent the interposers 72 and 73 is maintained in or moved to a set or a reset state.

The pin setting mechanism 71 is generally the same as the pin setting mechanism 70 in that it comprises a pair of pin setting interposers 80 and 81 each having a projection 83 disposed on opposite sides of the pin wheel. The interposer 81 also has a notch 79 therein which performs the same latching function as the notch 79 in interposer 72. A lever 84 pivoted to stud 76 joins the opposite ends of the interposers 80 and 81 and a tension spring 85 is provided. The spring 87 wrapped about the stud 76 biases the pin setting mechanism 71 to the position shown. A pull link 86 is connected to the interposer 81 and, when a pulling force is applied to this link, the projection 83 on interposer 81 moves from and projection 83 on interposer 80 moves into operative pin setting relation with respect to a pin on the pin wheel. The intermediate portions 62 of the pin setting bars 58 and 59 are notched to receive the interposers 80 and 81 and guide the longitudinal shifting movements thereof.

Actuation of the pull links 77 and 86 causes shifting movements of the pin setting mechanisms 70 and 71 and these mechanisms are latched in their actuated states due to the provision of notches 79 in the ends of interposers 72 and 81. It is necessary to provide a means for unlatching the pin setting mechanisms and this is accomplished by providing a pair of stationary stops 88 (see FIGURE 4) disposed on opposite sides of the pin setting mechanisms 70 and 71 and adapted to engage at least the interposers 72 and 81. The intermediate vertical portions 62 of the pin setting arms 58 and 59 move inwardly toward each other to effect setting of the pins and then outwardly past their initial or home position. As the pin setting arm on which one of the interposers is latched moves outwardly past its home position, the interposer abuts against its associated stop 88. This effectively disengages the pin setting arm from the interposer and the pin setting mechanism is automatically and immediately returned to its unactuated state by spring 87.

When the pin wheel 30 is at rest, four of the pins are positioned within the confines of the pin setting assembly 41 and these four pins are located directly in front of the set pin engaged by the escapement and holding pawls 43 and 50. If the pin setting assembly is in the position shown in FIGURE 2 of the drawings and a pulling force is applied only to pull link 66, the first pin in the pin setting assembly, designated 35′, will be maintained in or moved to its reset state by the projection 67 on the pin setting arm 58. The second pin 35″ will be engaged by the operative projection 74 on interposer 72 and maintained in or moved to its reset state. The projection 74 on the interposer 73 is in a position where it cannot engage the pin 35″ since pull link 77 has not been actuated. The third pin 35‴ at the pin setting assembly will be maintained in or assume a set state since it is adapted to be engaged by projection 83 on the interposer 81 and cannot be engaged by projection 83 on interposer 80. The fourth pin 35⁗ at the pin setting assembly is maintained in or moved to its set state by the projection 68 on the intermediate portion of pin setting arm 59. When the pull link 66 is released and the pin setting assembly returns to its original condition, the first and second pins 35′ and 35″ will be in the reset state and the third and fourth pins 35‴ and 35⁗ will be in the set condition. Tripping the holding and escapement pawls 50 and 43 will permit the pin wheel 30 to advance through an angular distance corresponding to three basic escapement units since the rotation of the pin wheel is not arrested until the third pin 35‴, which is the next adjacent set pin, engages and returns the escapement pawl.

The amount of angular rotation of the pin wheel 30 during an escapement operation is regulated and varied in accordance with the operation of the pin setting mechanisms 70 and 71. If pull link 77 is pulled prior to inward movement of the pin setting arms 58 and 59, then pin 35″ will assume a set state and the pin wheel will rotate a distance corresponding to two basic escapement units. Actuation of pull link 86 associated with pin setting mechanism 71 will cause pin 35‴ to assume a reset state and a movement of the pin wheel corresponding to four basic escapement units will take place during the next escapement operation. It should be noted that the first pin 35′ is always reset and the fourth pin 35⁗ is always set whereby the pin wheel must at least move through a distance corresponding to two basic escapement units and cannot rotate through a distance equal to more than four basic escapement units during an escapement operation. The condition of the pull links 66, 77 and 86 and the states of the pins at the pin setting assembly 41 in providing various numbers of escapement units is set forth below in tabular form.

| Pull Links Actuated | Pin 35′ | Pin 35″ | Pin 35‴ | Pin 35⁗ | No. of Basic Escapement Units |
|---|---|---|---|---|---|
| Link 66 only | Reset | Reset | Set | Set | 3 |
| Link 66 and Link 77 | Reset | Set | Set | Set | 2 |
| Link 66 and Link 86 | Reset | Reset | Reset | Set | 4 |

As successive escapement operations take place, the pins 35 on pin wheel 30 are advanced in an intermittent manner to the pin setting assembly 41. It should be noted that the pins 35 about the periphery of the pin wheel 30 maintain their lateral positions and states until they are again advanced to the pin setting assembly. The pin wheel and the pins define a limited memory which has information corresponding to past escapement operations stored therein. This is extremely valuable in accomplishing backspacing and forward-spacing operations on a character-by-character basis as is fully set forth in the above mentioned copending applications.

*Carrier mechanism*

Referring now to FIGURE 5 of the drawings, the reference numeral 90 designates a bracket having a pair of arms 91 which project forwardly toward the keylever portion of the single element typewriter 10. These arms are rigidly attached to the carrier 15. Spanning the arms 91 and defining a vertical mounting surface 92 is a portion of the bracket whose ends are turned rearwardly to provide a pair of laterally spaced mounting lugs 93. The bracket 90 carries the follower for the lead screw 18, the sensor for detecting set tab stops and related mechanism as will be explained in the following portion of the specification.

A follower carrier lever 94 has an elongated and radially extending aperture 95 formed therein and is mounted for limited horizontal and rotational movements on vertical mounting surface 92 of bracket 90 by a pin 95′. Extending from the follower carrier lever 94 is an offset tab 96 that rides in a vertically extending slot 97 formed in the mounting surface 92. The tab 96 and slots 97 cooperate in restricting the movement of the follower carrier lever 94. A spring 99 is connected to a rearwardly projecting tab 100 of the follower carrier lever 94 and extends to one of the lugs 93. This spring exerts a force which tends to move the follower carrier lever 94 to the left as seen when looking at FIGURE 5 of the drawings.

Pivoted to the forward end of the follower carrier lever 94 by pivot pin 101 is lead screw follower 102 having a tip portion 103 that is adapted to engage the thread of lead screw 18. A spring 104 is attached to the right end of follower 102 and extends to pin 95′ and tends to rotate the follower counterclockwise about pivot pin 101. The pivotal movement of the lead screw follower 102 is limited by a projecting stop portion 105 thereof which engages spring mounting tab 100.

The lead screw follower 102 normally engages the lead screw 18 as is shown in FIGURE 6 of the drawings so that rotative movements of the lead screw are translated to longitudinal movements of the print element 11 and the carrier 15 in front of the printing platen 17. Thus, the distance between adjacent set pins 35 and the setting of the pitch changing apparatus 28 will determine the extent of angular rotation imparted to the lead screw 18 and the movement of the carrier 15 in the forward escapement direction. Similarly, reverse rotation of the lead screw 18 will cause movement of the carrier 15 and print element 11 in the opposite or backspace direction.

Although it is possible to perform long longitudinal movements of the carrier 15 and print element 11 in the forward escapement and backspace directions by rapidly rotating the lead screw 18, this has been found to be relatively slow for extended movements of the carrier, such as those required during carrier return and long tabulation operations. To increase the overall speed of typing, the lead screw follower 102 is removed from the lead screw 18 and the carrier 15 is moved at a rapid rate independently of the lead screw for relatively long movements of the carrier 15. Different arrangements are employed for removing the follower 102 from the lead screw 18 for tabulation and carrier return operations. When a long tabulation operation is initiated, mechanism is actuated to rotate the follower carrier lever 94 and lift the follower 102 out of the lead screw 18. In a carrier return mode, the geometry and mounting of the lead screw follower 102 causes automatic removal of the follower when a pulling force is applied to the carrier 15 tending to move it in the carrier return or backspace direction.

The lead screw follower 102 engages the lead screw 18 during normal escapement operations and a reactive force $F_L$ occurs at the tip portion 103 of the follower 102 as is represented by an arrow in FIGURE 6 of the drawings. This reactive force is horizontal and is balanced by force $F_C$. The balancing of the horizontal reactive force $F_L$ and the opposing force $F_C$ occurs at a point 107 defined by the adjacent edges of offset tab 96 of the follower carrier lever 94 and the slot 97 in the vertical mounting surface 92 of bracket 90. The follower carrier lever 94 is pivoted in a clockwise direction about point 107 to remove the lead screw follower 102 from the lead screw 18. During such a removal operation the follower carrier lever 94 is guided by its mounting pin and the elongated aperture 95 but the actual pivot center is at point 107. The point 107 defining the pivot point for the lead screw follower 102 and the point of application for the horizontal reactive force is generally aligned with and in the same horizontal plane as the tip portion 103 of follower 102 when it engages the lead screw 18. The mounting system for the lead screw follower 102 is extremely stable and rugged under normal operating conditions so that rotations of the lead screw are accurately translated into longitudinal movements of the carrier 15 and print element 11 but yet the follower 102 is easily removed from the lead screw.

A vertical force $F_R$ (see FIGURE 6 of the drawings) occurs at the tip 103 of follower 102 because of the rotation of the lead screw during escapement and backspace operations. This produces a clockwise moment on the follower carrier lever 94 which is overbalanced by the counterclockwise moments of the components $F_{SV}$ and $F_{SH}$ of force $F_S$ (see FIGURE 6) exerted by spring 99 acting on follower carrier lever 94. The spring 99 is selected to provide sufficient force whereby pivotal movement of the follower carrier lever 94 about pivot point 107 and vertical movement of the lead screw follower 102 against lead screw 18 is normally prevented.

Disposed in side-by-side relation with the follower carrier lever 94 and mounted for pivotal and limited longitudinal movement is an operating lever 110. The left end of the operating lever is formed with a protuberance or hump 111 which underlies the tab 100 extending from the follower carrier lever 94. The right end of the operating lever 110 has a notch 112 formed therein which, when the follower 102 engages the lead screw 18, receives the hooked end of an interlock lever 113. A spring 115 extends from the left end of operating lever 110 and normally maintains the latter in a forward position with forwardly projecting tab 116 engaging lug 117 on the follower carrier lever 94. The interlock lever 113 is fixed to the bracket 90 and cooperates with the notch 112 to prevent longitudinal movement of operating lever 110 and follower carrier lever 94 to the right. As a result, the lead screw follower 102 cannot be removed from the lead screw by the vertical forces applied to the tip portion 103 of the follower. This interlock is particularly useful in preventing retraction of the lead screw follower 102 due to large transient vertical forces acting on follower 102 at the end of tabulation and carrier return operations. When a clockwise actuating force is applied to the right end of the operating lever 110 at the beginning of a long tabulation operation, the follower carrier lever 94 pivots in the same direction due to protuberance 111 engaging tab 100. It is noted that interlock lever 113 does not prevent or interfere with the clockwise movement of the operating lever 110. The lead screw follower 102 is lifted from the lead screw 18 so the carrier 15 and the print element 11 may be moved in the forward escapement direction independently of the lead screw.

The tabulation apparatus includes a plurality of stops disposed in a tab rack which extends in generally parallel relation with respect to the lead screw 18 and the printing platen 17. Each of these stops is selectively settable to a position where it is engageable by a tab sensor mounted for movement with the carrier. There are generally two types of tabulation operations involved in the carrier mechanism for the single element typewriter. The first is a long tabulation operation where the tab sensor is extended and latched in a tab stop sensing position. The follower 102 is removed from the lead screw 18 and the carrier 15 is moved in the forward escapement direction until the next set tab stop is sensed and the follower is dropped back into the previously homed lead screw at the proper tab position. The second type of tabulation operation is a short tabulation operation wherein the carrier is located in close proximity to a set tab stop. The tab sensor has a width which prevents it from being moved into set tab stop sensing relation if the next set tab stop is located in a distance corresponding to approximately one half the distance between adjacent turns of the thread on the lead screw. In this instance the follower remains in engagement with the lead screw and the carrier and print element are brought to the proper tab position as the lead screw is rotated to its home or reference position. A tab stop is provided for each turn of the thread on the lead screw. The number of basic escapement units between adjacent tab stops will, of course, depend on the setting of the pitch changing apparatus 28. In one constructed embodiment of the invention having three selectable printing pitches, there are 12, 14 or 16 escapement units between adjacent tab stops in accordance with the printing pitch selected by the typist.

Whenever a typist depresses the tabulation keybutton 118 (FIGURE 1), a vertical pulling force is imparted to operational latch 119 (FIGURE 5) as is represented by arrow 120. The mechanism for causing movement of the operational latch 119 is not shown in the drawings but may be of the type disclosed on pages 79–87 of the above mentioned instruction manual for the "Selectric" typewriter. Pulling operational latch 119 causes lever 121 to partially rotate about pivot axis 122. Movement of lever 121 pulls link 123 which in turn rotates torque bar 124 in a counterclockwise direction via a pin and trough connection 123' and 124'. A sliding connection is maintained between the movable carrier 15 carrying the tabulation sensing apparatus and the elongated torque bar 124 by means of a link 125 whose inturned lower end rides in a longitudinally extending channel 126 in the torque bar.

Downward and rearward pulling movement on link 125 rotates a crank assembly 127 which applies a clockwise torsional load to elongated torsion spring 128. This spring is preloaded to transfer a specified torque and will act as a rigid torque transmitting member until a torque greater than the preloading is applied to it. At the beginning of a long tabulation operation, the rotary clockwise movement of crank assembly 127 is transmitted by the torsion spring 128 to rotate a crank assembly 129. The crank assembly 129 has a projecting arm 130 which extends into an aperture 131 in an elongated tab lever 132. The tab lever 132 is pivoted rearward about pivot pin 133 in response to the rotation of crank assembly 129. When the tab lever 132 has pivoted sufficiently, a lug 134' of latch member 134 moves behind the hooked right end 132' of the tab lever 132 to latch the same in an extended position as shown in FIGURE 5B of the drawings. The tab lever 132 is mounted for limited horizontal sliding movement on the bracket 90 by the provision of an elongated aperture 135 that receives the pivot pin 133. A first spring 136 biases the tab lever 132 toward the front of the single element typewriter while a second spring 137 connected between one of the laterally spaced mounting lugs 93 and a side edge of aperture 131 biases the tab member 132 to the left when looking at FIGURE 5 of the drawings. A spring 138 is connected between an arm 134" of the tabulation latch member 134 and one of the mounting lugs 93 of the bracket 90. The arrangement is such that the lug 134' of tabulation latch member 134 will automatically drop behind hooked end 132' and latch the elongated tab lever 132 in its extended position when the tab lever is pivoted to the rear. The tab lever 132 remains in this position even though the pulling forces on operational latch 119 and link 125 representing the initiation of a long tabulation operation are removed.

Mounted intermediate the ends of the tab lever 132 is a tab sensor 140. The tab sensor 140 is pivotally mounted on the tab lever 132 but an upturned lug 141 on the end thereof projects in interfering relation with a tab 142 extending from the tab lever. In this manner the tab sensor 140 can be pivoted in a clockwise direction independently of the tab lever 132 but it cannot be pivoted in the other rotational direction. The tab sensor 140 is positioned in an extended tab stop sensing position when the tab lever 132 is latched in its pivoted position so that the tab sensor will be engaged by the next set tab stop as the carrier 15 moves in the forward escapement direction during a long tabulation operation. The manner in which the tab stops are set and cleared will be explained in detail in the following portion of the specification.

The rearward pivoting motion of the tab lever 132 in moving to its latched position causes clockwise rotation of bellcrank 144 since arm 145 of this lever extends and is loosely received in aperture 146 in the tab lever. The other arm of the bellcrank 144 engages the right end of operating lever 110. The operating lever 110 is pivoted and protuberance 111 engages the tab 100 of follower carrier lever 94 to lift the follower 102 from the lead screw 18. The design of the linkage is such that appreciable movement of the tab lever 132 is required before the follower 102 is lifted free of the lead screw 18. This prevents spurious or transient mechanical signals from inadvertently withdrawing the follower 102 from the lead screw 18 which would, of course, be objectionable.

As soon as the follower 102 is removed from the lead screw 18 and the lead screw is rotated to its home position, the carrier 15 and the print element 11 are rapidly moved in the forward escapement direction under the action of the typewriter mainspring and various connecting mechanisms. At the end of a long tabulation operation, the tab sensor 140 will detect and engage a set tab stop. The tab sensor 140 and tab lever 132 are rigidly coupled by the engagement of lug 141 of the sensor 140 with the tab 142 of tab lever 132 relative to rotational forces applied to the tab sensor in a counterclockwise direction. Because of this coupling tab sensor 140 and tab lever 132 move together to the right as seen in FIGURE 5 of the drawings. forces tending to move the carrier in the tabulation direction are sufficient to overcome the forces exerted by springs 136 and 137. This movement continues until the hooked end 132 of the tab lever 132 moves beyond the lug 134' of the latch member 134. At this point the various springs collapse the mechanisms mounted on the bracket 90 and return the follower 102 to engagement with the lead screw 18. The carrier 15 and the print element 11 are now properly positioned in the selected tab position.

A short tabulation operation occurs when the tab sensor 140 moves rearwardly and engages a set tab stop during the initial pivotal movement of the tab lever 132 when it is attempted to move the tab sensor to a tab stop sensing position. The width of the tab sensor 140 is equal to slightly more than one half the distance between adjacent turns of the thread on the lead screw 18. The tab lever 132 is prevented from pivoting sufficiently to engage the latch member 134 and a resisting force is applied to the crang assembly 129. The link 125 exerts an actuating force on the crank assembly 127 and the torque rating of the preloaded torsion spring 128 is exceeded. The torsion spring 128 acts as a lost motion coupling means under these conditions so that movements of crank assembly 127 are not transferred to crank assembly 129. The tab sensor 140 is not latched in its tab stop sensing position and the follower 102 is not removed from the lead screw 18. However, the carrier 15 and the print element 11 will be advanced incrementally as required when the lead screw 18 is homed to move these elements to the correct tab position.

*Tab rack assembly*

The tabulation mechanism comprises a tab rack 150 which is located directly to the rear of the lead screw 18 and extends in generally parallel relation therewith as is most clearly shown in FIGURES 5 and 7-9 of the drawings. The tab rack 150 has a plurality of longitudinally spaced and circumferentially extending grooves formed therein which receive a plurality of generally ring like tab stops 151. Each of the tap stops 151 has a projection 152 that, under certain conditions, is positioned in intercepting relation with the tab sensor 140 when the latter is in an extended position. Each tab stop also comprises a clearing projection 153 which is spaced circumferentially from the projection 152. A comb 154 formed from spring steel provides a detent means for holding the tab stops 151 in individual rotary adjusted positions relative to the tab rack 150.

The distance between adjacent tab stops 151 on the tab rack 150 is equal to the distance between adjacent turns of the thread on the lead screw 18. The tab rack 150 and the lead screw 18 are so positioned and aligned relative to one another that the print element 11 is located at a tab print position when the lead screw is in a predetermined rotational position or is homed. As will be explained later, the home position for all selected pitches is the same since the homing apparatus is located on the lead screw side of the pitch changing apparatus 28. Although the home position is the same, the number of basic escapement units between adjacent tab stops will vary with the pitch selected by the typist. The problems experienced in accurately aligning the print element 11 at a tab position due to the follower and lead screw driving connection makes it advisable to provide means to assist the typist in positioning the print element prior to the setting or clearing of individual tab stops. The additional means essentially comprises apparatus for rotating the tab rack 150 to an intermediate tab locate position where the projection 152 of each tab stop 151 is disposed so it will be detected by extended tab sensor 140 regardless of whetther the tab stop 151 is in a set or clear position. When the tab rack 150 is in the tab locate position, the typist initiates successive tabulation operations by depressing tabulation keybutton 118 and the carrier 15 and print element 11 move successively to each tab position. After the carrier and print element have reached the selected tab position, the tab rack 150 is returned to its normal position and a tab set and clear keybutton 155 is actuated to set or clear the selected tab stop.

The tab set and clear keybutton 155 is located on the keyboard of the single element typewriter and is pivotally mounted from a rod 156 projecting from the side frame of the typewriter. The keybutton 155 overlies the headed end of a T-shaped actuating member 157 and a link 158 interconnects this member with tab set and clear arm 159. The arm 159 is pivoted on pin 160 and is connected by a link 159' and a lever 160' to tab rack 150. Mounted for movement with the carrier 15 and extending rearwardly therefrom is a tab bracket 161 which has vertically spaced tab set and clear lugs 162 and 163, respectively. The lugs 162 and 163 are disposed in general vertical alignment with the tab sensor 140 and extend rearwardly to a position between the projections 152 and 153 of the tab stops 151. The lugs 162 and 163 are employed for changing the state or position of selected tab stops as required during a tab set or clear operation.

Forward depression of keybutton 155 in the set direction (clockwise movement about rod 156) rotates the T-shaped actuating member 157 to push link 158 which, acting through tab set and clear arm 159, rotates the tab rack 150 in the counterclockwise or tab set direction. The tab set lug 162 engages projection 152 and causes relative movement of the selected tab stop 151 aligned with the tab set lug 162 if the tab stop is not already in the set position. In this manner, the selected tab stop 151 is moved to or maintained in a tab set position where its projection 152 is disposed in interfering relation with tab sensor 140 when the latter is extended. Similarly, reward depression of the tab set and clear keybutton 155 (counterclockwise movement about rod 156) operates via the same linkage system to rotate the tab rack 150 clockwise so that projection 153 of a selected tab stop 151 is engaged by tab clear lug 163 to move projection 152 to a clear position if the tab stop 151 was initially in a set position. It is only necessary to locate the carrier and tab set and clear lugs 162 and 163 in proper aligned relation with a selected tab stop 151 and then depress set and clear keybutton 155 as desired. Homing spring 164 connected between the tab set and clear arm 159 and pin 160 is stretched during movement of the tab rack in either tab set or tab clear direction and operates to return the tab rack 150 and the tab set and clear keybutton 155 to their original positions when the keybutton is released. The normal position of the tab rack is depicted in FIGURE 8 wherein only the projections 152 of the set tab stops 151 are positioned to intercept the extended tab sensor 140 during tabulation operations.

To initiate a tab locate operation, the typist depresses tab locate keybutton 165 in the rearward direction (counterclockwise movement about rod 156). The movement of keybutton 165 is transmitted via L-shaped lug 165', T-shaped actuating member 157, link 158 and tab set and clear arm 159 to rotate the tab rack 150 clockwise partially toward the cleared position. The downward rocking motion of the tab locate keybutton 165, and consequently the rotation of tab rack 150, is limited by a stop 166 and the mechanism is maintained in this position by overcenter spring 167. The spring 167 provides an overcenter toggle action for the tab locate keybutton 165. This action insures that the keybutton 165, when depressed, will pivot to its locate position and remain there until the carrier reaches the tab stop to be set. The spring 167 is mounted from a movable stop member 165'' on L-shaped lug 165' and on a pin 168' riveted to a locator plate 168. This plate is secured by two screws to the side frame 168'' of the single element typewriter. The stop 166 is also secured to the side frame 168'' by the same screws and has an upper laterally projecting portion 166' which defines the forward stationary stop member. A projection 166'' of locator plate 168 provides the rear stationary stop member. These two stationary stop members 166' and 166'' are engaged by the movable stop member 165'' to limit the movements of L-shaped lug 165' and the tab locate keybutton 165.

The tab rack 150 is in an intermediate rotational position when tab locate keybutton 165 is depressed and movable stop member 165'' abuts stationary stop member 166' where the projection 152 of all tab stops 151, including tab stops in both the set and clear positions, will be disposed in the path of travel of the tab sensor 140 when the latter is extended as is shown in FIGURE 9 of the drawings. While the tab rack 150 is in the tab locate position, the tabulating keybutton 118 is depressed a number of times until the set and clear lugs 162 and 163 are brought into alignment with the selected tab stop 151. The located tab stop is then set or cleared as desired by appropriate actuation of the tab set and clear keybutton 155.

It should be apparent that all of the guess work and visual alignment steps which have characterized tab stop locating methods employed in connection with prior art proportional escapement typewriters are eliminated. The selected tab stops are located for setting or clearing in a minimum of time and with a minimum of effort when the tab rack assembly disclosed in this application is employed.

*Brake assembly*

Whenever the follower 102 is removed from the lead screw 18, the carrier is rapidly moved in either the forward escapement or the backspace direction depending on whether a long tabulation or carrier return operation is initiated. The mechanism for accomplishing this movement of the carrier 15 and the print element 11 is shown in FIGURE 10 of the drawings. A mainspring 170 is disposed in a cage-like housing 171 which in turn is attached to the rear of a cover plate 172. The mainspring 170 is connected with a shaft 173 and wound in such a manner that the shaft is biased for rotation in a counterclockwise direction. The shaft 173 is rotatably supported by bearings in the cover plate 172 and a frame portion 174 of the typewriter. Mounted on and rotatably with the shaft 173 are a brake drum 175, a carrier return cord drum 176 and a tabulation cord drum 177 having a carrier return gear 178 integrally formed therewith.

The brake drum 175 is generally cylindrical and has an outer braking surface 179 of a resilient material having a high coefficient of friction. As will be further explained, the brake drum 175 forms a portion of the brake assembly which permits the lead screw to be homed prior to tabulating movement of the carrier 15 and print element 11 even though the follower 102 is removed from the lead screw 18 at this time.

The carrier return cord drum 176 has a spiral groove in the outer periphery thereof and one end of a carrier return cord 180 is attached to this dum. After making several turns around the carrier return cord drum 176, the cord extends about guide rolls 181 and the other end is attached to the left side of the carrier 15. During a carrier return operation, the shaft 173 is driven by way of gear 178 in a clockwise direction to wind the carrier return cord 180 on carrier return cord drum 176 and to wind the mainspring 170. The carrier return mechanism for accomplishing rotation of shaft 173 in response to depression of a carrier return keybutton 169 (see FIGURE 1) forms no part of the present invention and is not disclosed in detail herein. This mechanism is depicted schematically at 169' in FIGURE 10 of the drawings. However, this mechanism is completely disclosed on pages 101–107 of the above mentioned instruction manual for the "Selectric" typewriter and reference should be made to this manual by anyone desiring a full explanation of the mechanism.

One end of a tabulation cord 182 is attached to the tabulation cord drum 177 which also has a spiral groove formed in its outer surface. The tabulation cord 182 extends from the tabulation cord drum 177 to a guide roll 183 and then to the right side of the carrier 15 where the other end of the cord is attached. The guide roll 183 is rotatably mounted at the outer end of a spring biased cord tension arm 184. Although the carrier return and tabulation cords 180 and 182 are nylon and are quite strong, they tend to stretch due to the constant jerk and pull on the cords. The spring biased cord tension arm 184 exerts sufficient force to maintain the tabulation cord 182 taut and this in turn rotates shaft 173 enough to keep the carrier return cord 180 tight at times when the follower is removed from the lead screw and the tightening roller does not engage the carrier return cord.

During a long tabulation operation the follower 102 is removed from the lead screw 18 and, after the lead screw has been homed, the mainspring 170 rotates the shaft 173 counterclockwise to wind the tabulation cord 182 on the tabulation cord drum 177. The carrier 15 and the print element 11 are quickly moved in the forward escapement direction until the extended tab sensor 140 engages the next set tab stop to end the long tabulation operation and cause the follower to re-engage the lead screw 18.

The lead screw 18 is homed or rotated to a predetermined angular position at the beginning of every carrier return and tabulation operation by mechanism which will be described in the following portion of the specification. The homing of the lead screw must be completed prior to the time the follower is released to re-engage the lead screw. While no problems have been experienced in this connection during carrier return operations, it has been found that during certain long tabulation operations where the carrier is initially positioned close to a set tab stop that the tab stop may be engaged by the tab sensor and the lead screw follower released before the homing operation is completed. A brake assembly comprising brake drum 175 is incorporated which delays the movement of the carrier and print element during a tabulation operation until the lead screw arrives at its home position.

Referring again to FIGURE 5 of the drawings, when tabulation operational latch 119 is pulled down in the direction of arrow 120, the lever 121 rotates counterclockwise about pivot axis 122 to initiate a tabulation operation as has been previously described. Movement of the lever 121 causes a laterally projecting tab 190 thereof to engage stud 191 extending rearwardly from the left end of brake lever 192. The brake lever pivots counterclockwise and pulls adjustable link 194 upward. The movement of link 194 is transmitted by coil spring 195 to brake member 196 which is disposed below the brake drum 175. The brake member 196 has a concave and serrated upper surface 197 that is forced into engagement with the surface 179 of the brake drum 175 against the action of spring 198. The right end of the brake lever 192 is drivingly connected to bifurcated lever 199 which carries cord tightening roller 200. As the brake member 196 is applied, the lever 199 pivots clockwise and roller 200 engages and presses down on carrier return cord 180. This equalizes the tension in the carrier return cord 180 with the tension in the tabulation cord 182. The arrangement is such that very little movement of the carrier is permitted in the forward escapement direction during the initial or lead screw homing portion of a tabulation operation when the lead screw follower is removed from the lead screw due to stretching of the carrier return cord 180 and the action of spring biased cord tension arm 184.

As the brake member 196 moves into engagement with brake drum 175 and roller 200 presses down on the carrier return cord 180, a latch 202 biased by spring 202' moves counterclockwise beneath a rearwardly projecting tab 203 of brake lever 192. The brake assembly is latched in an engaged condition and prevents movement of the carrier until lever 204 rotates in the clockwise direction and pulls on adjustable link 205 to release latch 202. When the latch is released, the various biasing springs gain control and the brake member 196 and roller 200 are returned to their original positions. The carrier 15 is then moved rapidly in the forward escapement direction under the action of mainspring 170 acting through tabulation cord 182. As will be hereinafter more fully explained, the clockwise rotation of lever 204 occurs only after the homing of the lead screw has been completed.

*Homing mechanism*

It should now be apparent that the lead screw 18 must be homed or rotated to a predetermined rotational position if the print element 11 and the carrier 15 are to be correctly positioned at the end of a tabulation or carrier return operation. A homing operation involves the steps of removing the escapement and holding pawls 43 and 50 from the pin wheel 30, allowing the lead screw 18 to rotate in a direction to advance the carrier 15 in a forward escapement direction under control of the constant torque device 25, sensing when the lead screw 18 has reached a predetermined rotational or home position and then re-engaging the escapement and holding pawls 43 and 50 with the pin wheel 30.

Referring now to FIGURES 11 and 12 of the drawings which are perspective views taken from the opposite sides of the single element typewriter, when the pawl release arm 56 moves downward the pawl release lever 57', which is similar to and is an alternate form of the release lever 57 shown in FIGURE 2, lifts the escapement and holding pawls 43 and 50 from engagement with the pin wheel 30. As the tabulation operational latch 119 is pulled down in the direction of arrow 120, the lever 121 rotates counterclockwise about axis 122 as has been previously explained. A stud 210 mounted on the left end of lever 121 engages the top surface of and causes crossover lever 211 to pivot in a counterclockwise direction. A pin 212 extending from a depending arm of crossover lever 211 is received in a slot 213 formed in link member 214. This pin is attached to one end of a coil spring 215 whose other end is connected to a pin 216 carried by an H-shaped actuating member 217. The actuating member 217 is connected by stud 218 to lever 219 which receives the stationary pivot pin 229 and relatively movable pin 238 to control the removal of the escapement and the holding pawls 43 and 50 from the pin wheel 30 and the operation of the home sensing and home unlatching pawls as will be further described. The lever 219 is pivoted on pin 229 and the forward end of this lever which carries pin 238 rotates clockwise in FIGURE 11 of the drawings. The upward movement of pin 238 in FIGURE 12 pivots pawl release are 56 about pivot pin 229.

Crossover lever 211 is also adapted to be rotated in a counterclockwise direction when its top surface is engaged by a stud 220 projecting from plate member 221 which is connected to carrier return operational latch 222. When the carrier return keybutton 169 is depressed, the operational latch 222 moves downward in the direction of arrow 223 and the escapement and holding pawls 43 and 50 are removed from the pin wheel as will be hereinafter more fully explained. The mechanism interconnecting the carrier return keybutton 169 and the operational latch 222 is not described in this specification. However, this mechanism is fully explained on pages 79–87 of the above mentioned instruction manual for the "Selectric" typewriter.

The apparatus is highly simplified in construction and operation and permits withdrawal of the escapement and holding pawls 43 and 50 from the pin wheel 30 in response to actuation of either the carrier return operational latch 222 or the tabulation operational latch 119.

The spring 215 is designed to act as a force transmitting member until a predetermined force is exceeded. When this occurs, the spring stretches and provides a lost motion connection between crossover lever 211 and H-shaped actuating member 217. Damage to the various parts and drive mechanisms is prevented by this arrangement if one of the operational latches 119 or 222 is actuated when the lead screw is already homed as will be hereinafter more fully explained.

Referring now to FIGURE 12 of the drawings, there is shown a shaft 225 which is connected to the shaft 31 mounting the pin wheel 30 by a selected pair of pitch gears, not shown. This apparatus is fully disclosed in the above identified copending patent application Ser. No. 311,377, entitled "Pitch Changing Apparatus for Proportional Escapement Typewriter," wherein the shafts 47 and 31 correspond to the shafts 225 and 31 of the present application. The shaft 225 rotates at approximately twice the speed of the pin wheel 30 in the direction indicated by arrow 226 when the pin wheel 30 rotates in the direction represented by arrow 39 (FIGURE 2) under the action of the constant torque device 25 to advance the carrier 15 and the print element 11 in the forward escapement direction. Mounted on the shaft 225 is a homing disc 227 having a pair of oppositely disposed and radially projecting homing lugs 228. It is noted that the shaft 225 is located on the lead screw side of the pitch changing apparatus 28 so that the home position of the lead screw 18 remains the same regardless of the pitch selected by the typist. The speed of the shaft 225 will vary slightly relative to the speed of the pin wheel in accordance with the selected printing pitch since this determines the number of basic escapement units for each turn of the lead screw.

The pawl release arm 56 is pivoted from a stationary part of the typewriter by the stationary pivot pin 229 which also pivotally mounts home sensing and home unlatching pawls 230 and 231, respectively. These pawls are disposed in side-by-side relation and the home unlatching pawl 231 has an elongated slot therein, not particularly shown, which receives the pivot pin 229. The home unlatching pawl 231 is movable longitudinally relative to the home sensing pawl 230 but is mounted for pivotal movement therewith by means of a headed rivet 230′ on home sensing pawl 230 which extends through a slot in home unlatching pawl 231. Spring 232 is attached to the rear end of the home unlatching pawl 231 and tends to pivot pawls 230 and 231 clockwise about pivot pin 229 since the two pawls are mounted for joint pivotal movement. The spring 232 also tends to move the home unlatching pawl 231 rearwardly relative to the home sensing pawl 230. During normal escapement operations the home unlatching pawl 231 is positioned in a forward position due to latch member 233 which engages tab 234 projecting laterally from this pawl. The latch member 233 has a latching notch 235 therein and is normally biased forward against latch stop 236 by spring 237 which is appreciably stronger than the spring 232. The relatively movable pin 238 is received in the rear end of the pawl release arm 56 and interconnects this arm with a lug extending from the home sensing pawl 230.

At the beginning of a carrier return or tabulation operation, the lever 219 is pivoted about stationary pivot pin 229 and the pawl release arm 56 is pivoted counterclockwise in FIGURE 12. The pawls 230 and 231 are pivoted counterclockwise about pivot pin 229 against the action of spring 232. Unless the lead screw 18 is already in the home position, the tips of the home sensing and home unlatching pawls 230 and 231 are pivoted downwardly into the path of travel of the homing lugs 228. The rear ends of the pawls move upwardly and eventually the transversely extending tab 234 of home unlatching pawl 231 moves rearwardly into notch 235 of latch member 233 due to the sliding connection existing between the home sensing and home unlatching pawls 230 and 231 and the action of spring 232. The tip portion of the home unlatching pawl 231 is now disposed to the rear of the home sensing pawl 230 as is shown by dotted lines in FIGURE 12 of the drawings so that it is the first of the pawls to be engaged by one of the homing lugs 228 when the shaft 225 rotates. The movement of the pawl release arm 56 has caused pawl release lever 57′ to lift the escapement and holding pawls 43 and 50 from the pin wheel 30. The latch member 233 serves to maintain the home sensing and home unlatching pawls in their lowered homing lug sensing positions and the pin wheel escapement and holding pawls in their retracted positions.

The lead screw 18, shaft 225 and pin wheel 30 are rotated together by the constant torque device 25 when the escapement and holding pawls are removed. Eventually, one of the homing lugs 228 engages the tip of unlatching pawl 231 and moves the same forwardly against the action of its spring 232. The tab 234 of the unlatching pawl clears the notch 235 and the various parts and pawls return to their initial positions under the action of the spring 232. In particular, spring 232 moves pin 238 to release the escapement and holding pawls and permits the crossover linkage of FIGURE 11 to return to the positions shown. The homing lugs 228 are so positioned on the homing disc 227 that when the homing mechanism is unlatched, the escapement and holding pawls 43 and 50 drop into the pin wheel 30 in the space between two of the pins 35. The pin wheel 30 continues to rotate until the next pin 35 engages the escapement or holding pawl 43 and 50 depending on whether the pin is in a set or reset state. The system is then at rest and the home sensing pawl 230 is disposed above and approximately the middle of the adjacent homing lug 228.

As discussed above, the brake assembly is provided to hold the carrier 15 against movement in a forward escapement direction when a tabulation operation in initiated until the homing of the lead screw is completed. The brake member 196 is released when lever 204 rotates clockwise to rotate latch 202 against the action of spring 202′ (FIGURE 5). The far end of the lever 204 has a projecting tab 206 which is adapted to engage the flat portion interconnecting the two side members and senses the pivoting motion of the H-shaped actuating member 217. When the member 217 returns upwardly to its original position indicating the end of a homing operation, the lever 204 is rotated to release the brake member 196 and retract the cord tightner roller 200. It should also be noted that the lever 204 and latch 202 are so designed that the brake assembly cannot be latched in operative relation unless a homing operation has been initiated at the beginning of a tabulation operation.

It is entirely possible that the lead screw 18 will be in the home position when the carrier return keybutton 169 or tabulation keybutton 118 is depressed. Under this condition, the home sensing pawl 230 immediately engages one of the homing lugs 228 projecting from the homing disc 227. Pivotal movement of the home sensing and unlatching pawls 230 and 231 is prevented and the escapement and holding pawls 43 and 50 are not withdrawn from the pin wheel 30. The predetermined force setting of spring 215 is exceeded under these conditions and a lost motion connection is provided between the operational latches 119 and 222 and the H-shaped actuating member 217. The brake assembly is not latched in the event a tabulation operation has been initiated with the lead screw homed. No rotational movement is imparted to the lead screw since it is already in a predetermined rotational position or homed and the carrier return or tabulation operation proceeds to completion.

*Operation*

Considering now the operation of the above described apparatus, a carrier return operation is initiated by depression of carrier return keybutton 169. This causes homing of the lead screw 18 upon downward movement of carrier return operational latch 222 if the lead screw is not already in the home or predetermined rotational position. At the same time the shaft 173 is rotated via carrier return gear 178 and the carrier return cord 180 is wrapped about carrier return dum 176 as shown in FIGURE 10 of the drawings.

A pulling force in the backspace or carrier return direction is applied to the carrier 15 by the carrier return cord 180 and this force is in turn imparted to follower carrier lever 94. The pulling force and the geometry of the various parts cause the lead screw follower 102 to pivot clockwise about pivot pin 101. The follower 102 has a relatively long lower surface 240 which spans and overlies adjacent turns of the thread on the lead screw 18 when the follower is in its pivoted position during a carrier return operation as is clearly shown in FIGURE 13 of the drawings. This arrangement is highly simplified in construction and operation. No complicated ancillary means are required to remove the follower 102 from the lead screw 18 during a carrier return operation as this is accomplished automatically. The lower surface 240 of the lead screw follower spans several turns of the thread on the lead screw and there is no objectionable audible ratcheting of the follower relative to the lead screw. When the left margin stop is engaged, the lead screw has been homed as required and the carrier return driving force is removed from shaft 173. The mainspring 170 gains control and the tabulation cord 182 exerts a force on the carrier in the forward escapement direction which allows the follower 102 to pivot back into the lead screw 18 under the action of spring 104. The carrier 15 and the print element 11 are therefore properly positioned at the left printing margin at the end of the carrier return operation.

Assuming selected tab stops 151 have been set as desired, a tabulation operation is initiated by depressing tabulation keybutton 118 to actuate tabulation operational latch 119. If the lead screw 18 is not already at the predetermined rotational or home position, the escapement and holding pawls 43 and 50 are withdrawn from the pin wheel 30 and the lead screw rotates until one of the sensing lugs 228 is sensed by home unlatching pawl 231. During this homing operation the brake member 196 is in engagement with brake drum 176 and cord tightener roller 200 presses down against carrier return cord 180. The lead screw follower 102 is withdrawn from the lead screw 18 upon pivotal movement of operating lever 110 in response to the rotation of tabulation torque bar 124. The tab sensor 140 moves to an extended position if the tab sensor 140 does not engage a set tab stop 151 when it moves rearwardly. Even though the lead screw follower 102 is out of engagement with the lead screw 18, the brake assembly prevents movement of the carrier 15 in the forward escapement direction at this time.

At the end of the homing operation, the latch 202 is released and the brake assembly returns to its initial condition. The mainspring 170 gains control and rotates shaft 173 counterclockwise to wrap tabulation cord 182 on tabulation cord drum 177. The carrier 15 moves rapidly in the forward escapement direction until the extended tab sensor 140 engages a set tab stop 151. The tabulation lever 32 and related mechanisms collapse so that the follower 102 drops back into the lead screw 18. The carrier 15 and the print element 11 are now properly positioned at the selected tab position.

The lead screw 18 may already be at the home position when a tabulation operation is initiated. In this event, the home sensing pawl 230 engages one of the homing lugs 228 on homing disc 227 so that the escapement and holding pawls 43 and 50 are not removed from the pin wheel 30. The brake assembly is not applied since latch 202 is held in a non-latching state by lever 204 whose tab 206 senses the position of actuating member 217. The rest of the tabulation operation proceeds in the manner described above.

It is also possible that the tab sensor 140 will engage a set tab stop 151 as the tab lever 132 attempts to move the tab sensor to its extended position. When this occurs, the follower 102 is not retracted from the lead screw 18. The carrier 15 and the print element 11 move to the selected tab position when the lead screw 18 rotates during a homing operation under these conditions.

Tab locate mechanism is provided which permits rotation of the tab rack 150 to an intermediate position when tab locate keybutton 165 is depressed. At this position of the tab rack 150, each of the tab stops 151 is engageable by the extended tab sensor 140 regardless of whether the tab stop is in a set or a clear state. The typist performs a number of tabulation operations until the selected tab position is reached. Then the tab set and clear keybutton 155 is depressed to set or clear the selected tab stop as desired. In this manner each and every tab stop is positively located without guesswork on the part of the typist.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Tabulation apparatus for use with a proportional escapement typewriter comprising:
    a typewriter frame and a carrier;
    a single print element having characters formed thereon movably mounted on said carrier;
    character selection apparatus for moving said print element to bring a selected character into printing position;
    an elongated lead screw rotatably supported in said frame;
    drive means for rotating said lead screw to advance said carrier and said print element in a forward escapement direction by a distance corresponding to the width of a selected character in response to actuation of said character selection apparatus;
    a follower engaging said lead screw;
    means to remove said follower from engagement with said lead screw;
    means to advance said carrier in said forward escapement direction when said follower is out of engagement with said screw;
    a tabulation assembly comprising a tabulation rack extending in generally parallel relation with said lead screw;
    a plurality of spaced tabulation stops individually movably mounted on said tabulation rack;
    first typist controlled means for moving any selected tabulation stop between set and clear states;
    a tabulation sensor mounted on said carrier and movable between extended and retracted positions;
    said tabulation sensor when in said extended position normally engaging only those of said tabulation stops which are in said set state upon advancement of said carrier in said forward escapement direction;
    second typist controlled means for moving said tabulation rack; and
    stop means operative upon actuation of said second typist controlled means to limit movement of said tabulation rack to a position where said tabulation sensor engages all of said tabulation stops irrespective of the states thereof when said tabulation sensor is in said extended position upon advancement of said carrier in said forward escapement direction.

2. Apparatus according to claim 1 further characterized by:
    said first typist controlled means comprises a set and clear lug means mounted on said carrier;

each of said tabulation stops having a pair of projections;

said set and clear lug means being positioned in nesting relation between said projections;

means to rotate said tabulation rack in both directions to cause said projections to engage said lug means and effect relative movement between said tab stops and said tab rack; and said second typist controlled means comprises means to rotate said tabulation rack in one of said directions to a limited extent.

3. Apparatus according to claim 1 further characterized by:

said first typist controlled means comprises a tabulation stop set and clear keybutton; and said second typist controlled means comprises a tabulation locate keybutton.

4. Tabulation apparatus for use with a typewriter comprising:

a typewriter frame and a carrier;

a print element mounted on said carrier;

an elongated lead screw rotatably supported in said frame and having a thread thereon of a predetermined pitch;

a follower mounted on said carrier and engaging said thread of said lead screw;

drive means for rotating said lead screw to advance said carrier and said print element in a forward escapement direction;

means to remove said follower from engagement with said lead screw;

means to advance said carrier in said forward escapement direction when said follower is out of engagement with said lead screw during a tabulation operation;

a tabulation assembly comprising a tabulation rack extending in generally parallel relation with said lead screw;

a plurality of spaced tabulation stops individually movably mounted on said tabulation rack;

means for moving any selected tabulation stop between set and clear states;

a tabulation sensor mounted on said carrier and movable between extended and retracted positions;

said tabulation sensor when in said extended position normally being adapted to detect only those of said tabulation stops which are in said set state upon advancement of said carrier in said forward escapement direction;

means for effecting relative movement between said tabulation rack and said tabulation sensor; and stop means operative upon actuation of said means for effecting to limit relative movement between said tabulation rack and said tabulation sensor to position all of said tabulation stops where said tabulation sensor when in said extended position detects all of said tabulation stops irrespective of the states thereof upon advancement of said carrier in said forward escapement direction.

5. Apparatus according to claim 4 further characterized by:

one of said tabulation stops being provided on said tabulation rack for each turn of said thread on said lead screw.

6. Apparatus according to claim 4 further characterized by:

said means for moving any selected tabulation stop between set and clear states comprises a tabulation stop set and clear keybutton; and said means for effecting relative movement comprises a tabulation locate keybutton.

7. Tabulation apparatus for use with a typewritter comprising:

a typewriter frame and a carrier;

an elongated escapement member supported in said frame;

a follower means mounted on said carrier and engaging said escapement member;

drive means for effecting relative movement between said escapement member and said follower means to advance said carrier in a forward escapement direction;

means to remove said follower means from engagement with said escapement member;

means to advance said carrier in said forward escapement direction when said follower means is out of engagement with said escapement member;

a tabulation assembly comprising a tabulation rack extending in generally parallel relation with said escapement member;

a plurality of spaced tabulation stops individually movably mounted on said tabulation rack;

means for moving any selected tabulation stop between set and clear states;

a tabulation sensor mounted on said carrier;

said tabulation sensor normally detecting only those of said tabulation stops which are in said set state upon advancement of said carrier in said forward escapement direction during a tabulation operation;

means for effecting relative movement between said tabulation rack and said tabulation sensor; and stop means operative upon actuation of said means for effecting to limit relative movement between said tabulation rack and said tabulation sensor to position all of said tabulation stops where they are all sensed by said tabulation sensor irrespective of the states thereof upon advancement of said carrier in said forward escapement direction during a tabulation operation.

8. Apparatus according to claim 7 further characterized by:

said means for moving any selected tabulation stop comprising means to rotate said tabulation rack in both rotational directions; and said means for effecting relative movement comprises means to rotate said tabulation rack in one of said directions to a limited extent to position said tabulation rack in an intermediate position.

9. Tabulation apparatus for use with a typewriter comprising:

a typewriter frame and a carrier;

an elongated escapement member supported in said frame;

a follower means mounted on said carrier and engaging said escapement member;

drive means for effecting relative movement between said escapement member and said follower means to advance said carrier in a forward escapement direction;

means to remove said follower means from engagement with said escapement member;

means to advance said carrier in said forward escapement direction when said follower means is out of engagement with said escapement member;

a tabulation assembly comprising a tabulation rack extending in generally parallel relation with said escapement member;

a plurality of spaced tabulation stops individually movably mounted on said tabulation rack;

means for moving any selected tabulation stop between set and clear states;

a tabulation sensor mounted on said carrier;

said tabulation sensor normally detecting only those of said tabulation stops which are in said set state upon advancement of said carrier in said forward escapement direction during a tabulation operation;

means for effecting relative movement between said tabulation rack and said tabulation sensor to position all of said tabulation stops where they are all sensed by said tabulation sensor irrespective of the states thereof upon advancement of said carrier in said forward escapement direction during a tabulation operation;

said means for moving any selected tabulation stop comprises means to rotate said tabulation rack in both rotational directions;

said means for effecting relative movement comprises means to rotate said tabulation rack on one of said directions to a limited extent to position said tabulation rack in an intermediate position; and means to yieldably maintain said tabulation rack in said intermediate position.

10. Tabulation apparatus for use with a typewriter comprising:

a typewriter carrier;

escapement appartus for moving said carrier in a forward escapement direction;

means to disengage said escapement apparatus;

means to advance said carrier in said forward escapement direction when said escapement apparatus is disengaged;

a tabulation assembly comprising a tabulation member;

a plurality of spaced tabulation stops individually movably mounted on said tabulation member;

means for moving any selected tabulation stop between set and clear states;

a tabulation sensor means mounted on said carrier;

said tabulation sensor means normally detecting only those of said tabulation stops which are in said set state upon advancement of said carrier in said forward escapement direction during a tabulation operation;

means for effecting relative movement between said tabulation member and said tabulation sensor means; and stop means operative upon actuation of said means for effecting to limit relative movement between said tabulation member and said tabulation sensor means to position all of said tabulation stops where they are all sensed by said tabulation sensor means irrespective of the states thereof upon advancement of said carrier in said forward escapement direction during a tabulation operation.

11. Apparatus according to claim 10 further characterized by:

said means for moving comprises a tabulation set and clear keybutton; and said means for effecting relative movement comprises a tabulation locate keybutton.

12. Tabulation apparatus for use with a typewriter comprising:

a typewriter carrier;

escapement apparatus for moving said carrier in a forward escapement direction;

means to disengage said escapement apparatus;

means to advance said carrier in said forward escapement direction when said escapement apparatus is disengaged;

a tabulation assembly comprising a tabulation member;

a plurality of spaced tabulation stops individually movably mounted on said tabulation member;

means for moving any selected tabulation stop between set and clear states;

a tabulation sensor means mounted on said carrier;

said tabulation sensor means normally detecting only those of said tabulation stops which are in said set state upon advancement of said carrier in said forward escapement direction during a tabulation operation;

means for effecting relative movement between said tabulation member and said tabulation sensor means; and stop means operative upon actuation of said means for effecting to limit relative movement between said tabulation member and said tabulation sensor means to position all of said tabulation stops where they are all sensed by said tabulation sensor means irrespective of the states thereof upon advancement of said carrier in said forward escapement direction during a tabulation operation.

References Cited

UNITED STATES PATENTS

| 915,749 | 3/1909 | Drewell | 197—90 |
| 990,569 | 4/1911 | Lasker | 197—90 |
| 1,003,414 | 9/1911 | Barrett. | |
| 1,082,033 | 12/1913 | Lockwood | 197—179 |
| 2,099,011 | 11/1937 | Gabrielson | 197—179 |
| 2,213,572 | 9/1940 | Tarkelson | 197—84.1 |
| 2,478,630 | 8/1949 | Hill | 197—179 X |
| 2,663,399 | 12/1953 | Frey et al. | 197—90 X |
| 2,818,958 | 1/1958 | Toeppen et al. | 197—85 |
| 2,909,935 | 10/1959 | Dodge | 197—64 X |
| 2,965,212 | 12/1960 | Toggenburger | 197—176 |
| 3,018,870 | 1/1962 | Lambert et al. | 197—176 |
| 3,040,859 | 6/1962 | Toeppen | 197—63 |
| 3,223,222 | 6/1965 | Parker | 197—151 |
| 3,225,886 | 12/1965 | Cetran et al. | 197—84 |

ROBERT E. PULFREY, *Primary Examiner.*

E. T. WRIGHT, *Assistant Examiner.*